United States Patent
Kim

(10) Patent No.: US 7,778,197 B2
(45) Date of Patent: Aug. 17, 2010

(54) MOBILE COMMUNICATIONS TERMINAL FOR SUPPORTING SPACE-TIME HYBRID AUTOMATIC REPEAT REQUEST TECHNIQUES AND METHOD THEREOF

(75) Inventor: Ha-Sung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 743 days.

(21) Appl. No.: 11/634,874

(22) Filed: Dec. 7, 2006

(65) Prior Publication Data

US 2007/0135152 A1   Jun. 14, 2007

(30) Foreign Application Priority Data

Dec. 8, 2005  (KR) .................. 10-2005-0119857

(51) Int. Cl.
*G08C 15/00*   (2006.01)
(52) U.S. Cl. .................. 370/252; 370/329; 370/342; 375/299; 714/755; 714/790
(58) Field of Classification Search ................. 370/252, 370/329, 342; 375/299; 714/755, 790
See application file for complete search history.

(56) References Cited

U.S. PATENT DOCUMENTS

| | | | |
|---|---|---|---|
| 2002/0088005 A1* | 7/2002 | Wu et al. ..................... | 725/129 |
| 2003/0061190 A1* | 3/2003 | Gueguen et al. ............... | 707/1 |
| 2003/0103584 A1* | 6/2003 | Bjerke et al. ................ | 375/340 |
| 2003/0185181 A1* | 10/2003 | Balachandran et al. ...... | 370/337 |
| 2004/0097215 A1* | 5/2004 | Abe et al. .................... | 455/403 |
| 2005/0185669 A1* | 8/2005 | Welborn et al. ............. | 370/465 |
| 2007/0140377 A1* | 6/2007 | Murakami et al. .......... | 375/299 |
| 2007/0177630 A1* | 8/2007 | Ranta et al. ................. | 370/473 |
| 2009/0254795 A1* | 10/2009 | Palanki et al. ............... | 714/776 |

* cited by examiner

*Primary Examiner*—Ricky Ngo
*Assistant Examiner*—Luat Phung
(74) *Attorney, Agent, or Firm*—Birch, Stewart, Kolasch & Birch, LLP

(57) ABSTRACT

A mobile communications terminal for supporting a space-time Hybrid Automatic Repeat reQuest (HARQ) schemes and a method thereof, are discussed. According to an embodiment, the mobile communications terminal includes an encoder for encoding data inputted based upon at least one preset puncturing table, and a mapper/modulator for mapping the encoded data to a physical channel and modulating the mapped data.

18 Claims, 5 Drawing Sheets

| 12 | 16 | 17 |
|----|----|----|
| 05 | 07 | 17 |

B₂

| 17 | 17 | 17 |
|----|----|----|
| 00 | 14 | 17 |

B₃

| 14 | 16 | 17 |
|----|----|----|
| 14 | 16 | 17 |

B₄

| 12 | 16 | 17 |
|----|----|----|
| 12 | 16 | 17 |

MOBILE COMMUNICATIONS TERMINAL FOR SUPPORTING SPACE-TIME HYBRID AUTOMATIC REPEAT REQUEST TECHNIQUES AND METHOD THEREOF

RELATED APPLICATION

The present application claims the priority benefit of the Korean Patent Application No. 10-2005-0119857, filed on Dec. 8, 2005 in Republic of Korea, which is herein expressly incorporated by reference in its entirety.

BACKGROUND OF THE INVENTION

1. Field of the Invention

The present invention relates to a mobile communications terminal, and particularly, to a mobile communications terminal for supporting Space-Time Hybrid Automatic Repeat reQuest (HARQ) schemes, which is capable of implementing high-speed and high-reliable packet data transmissions, and to a method thereof.

2. Discussion of the Background Art

In general, a mobile communications terminal is a communication device capable of providing a wireless call to another party and providing a wireless connection anytime and anywhere by a switching control of an MSC (Mobile Switching Center) while moving in a service region formed by a BS (Base Station). Especially, a mobile communications terminal having a large display device and a camera function for capturing videos (moving pictures) and images is recently gaining popularity.

For the mobile communications terminal, there are various types of mobile communications systems employed, such as Code Division Multiple Access (CDMA), Time Division Multiple Access (TDMA), Frequency Division Multiple Access (FDMA), Global System for Mobile communications (GSM), and the like. International Telecommunication Union (ITU) has chosen International Mobile Telecommunication 2000 (IMT-2000) as a third generation mobile communications system for supplying multimedia services having a better quality regardless of regions.

At the beginning of the third generation mobile communication market, particularly, an advent of third generation competitive services, such as a wireless RAN, digital multimedia broadcast, portable Internet, and the like, requests High Speed Downlink Packet Access (HSDPA) to be quickly advanced into the market. The HSDPA denotes an access technique which is a method located on an evolution of the existing asynchronous IMT-2000 to thus be additionally employed for a high-speed data transmission over downlink. The HSDPA can advantageously increase a downlink transmission speed and decrease transmission delay accordingly.

Here, advanced mobile communications systems such as WCDMA and CDMA2000 systems use convolutional and turbo codes to support high-speed and high-reliable packet data transmission with a low bit error rate (BER) of less than $10^{-6}$. The high-speed and high-reliable packet data transmission has become an important issue in 3.5-generation mobile communications systems such as the HSDPA system employing the turbo code.

Here, the turbo code shows an excellent BER performance at the same signal-to-noise ratio (SNR) region as compared to the convolutional code. However, the turbo code shows a poor error-floor effect at the moderate-to-high SNR and provides a lower gain even with short interleaver sizes.

A Hybrid Automatic Repeat reqQuest (HARQ) where an ARQ technique is combined with channel codes has been used to lower the packet error rate, and is suitable for a high-speed packet data transmission with the different quality of service (QoS) over wireless channels. However, retransmissions with the fixed code rate results in the relatively poor delay of transmission and the waste of bandwidth. The technologies (schemes) cannot support full flexibility in terms of fixed code rates, error protection and multiple antennas.

Furthermore, in the mobile communications terminal for supporting the HARQ technique according to the related art and the method thereof, the HARQ technique employing a rate-compatible punctured serial concatenated convolutional code is used. Accordingly high-speed and high-reliable packet data transmission cannot be efficiently implemented.

SUMMARY OF THE INVENTION

Therefore, an object of the present invention is to provide a mobile communications terminal for supporting a high-speed and high-reliable packet data transmission by employing a Hybrid Automatic Repeat reQuest (HARQ) scheme which uses a space-time block coding combined with a rate-compatible punctured Serial Concatenated Convolutional Code (SCCC), and to provide a method thereof.

Another object of the present invention is to provide a mobile communications terminal and method for supporting a space-time HARQ scheme, which address the limitations and disadvantages associated with the related art.

To achieve these and other advantages and in accordance with the purpose(s) of the present invention, as embodied and broadly described herein, there is provided according to an aspect of the present invention a mobile communications terminal for supporting a space-time HARQ scheme, comprising: an encoder for encoding data inputted based upon at least one preset puncturing table; and a mapper/modulator for mapping the encoded data to a physical channel and modulating the mapped data.

To achieve these and other advantages and in accordance with the purpose(s) of the present invention, a method for supporting a space-time HARQ scheme according to another aspect of the present invention comprises: encoding data inputted based upon at least one preset puncturing table; and mapping the encoded data to a physical channel and modulating the mapped data.

According to another aspect of the present invention, there is provided a mobile communications terminal for supporting a Hybrid Automatic Repeat reQuest (HARQ) scheme, comprising: a rate-compatible punctured SCCC (Serial Concatenated Convolutional Code) encoder configured to encode input data based upon at least one preset puncturing table; and a space-time block encoder configured to space-time block code the encoded data.

According to another aspect of the present invention, there is provided a method for supporting a Hybrid Automatic Repeat reQuest (HARQ) scheme, comprising: first encoding input data based on at least one preset puncturing table using a rate-compatible punctured serial concatenated convolutional coding; and second encoding the first encoded data by using a space-time block coding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a view illustrating an example of a rate-compatible puncturing table in accordance with the present invention;

DETAILED DESCRIPTION OF THE PREFERRED EMBODIMENTS

Description will now be given in detail of the preferred embodiments of the present invention, with reference to the accompanying drawings.

Hereinafter, with reference to the accompanying drawings, detailed explanation will now be given for the preferred embodiments of a mobile communications terminal for supporting space-time HARQ schemes capable of implementing high-speed and high-reliable packet data transmissions by employing a HARQ scheme which uses a space-time block coding and a rate-compatible punctured Serial Concatenated Convolutional Code (SCCC) combined with the space-time block coding, and a method thereof.

A HARQ scheme employing a space-time block coding combined with the rate-compatible punctured SCCC has not been studied. Here, the rate-compatible punctured SCCC can provide error flow lower than that of turbo codes having short interleavers, and be more flexible for code concatenation, resulting in a lower packet error rate at a moderate-to-high SNR. In addition, the rate-compatible punctured SCCC can provide diversity to a receiver to increase the capacity and data rate in multiple antenna environments.

Further, according to the present invention, the HARQ scheme based upon the space-time block code (STBC) can improve packet error and throughput performance and does not require any bandwidth expansion or feedback from the receiver to a transmitter. Accordingly, its complexity is mainly similar to that of maximal ratio combining.

Furthermore, the HARQ scheme falls into Incremental Redundancy (IR) type-II HARQ scheme, in which more bits are incrementally transmitted to adaptively meet requirements with respect to service error and throughput performance of a system. Therefore, the transmitter needs to transmit only supplemental code bits to obtain the next lowest rate code.

Figure 1:
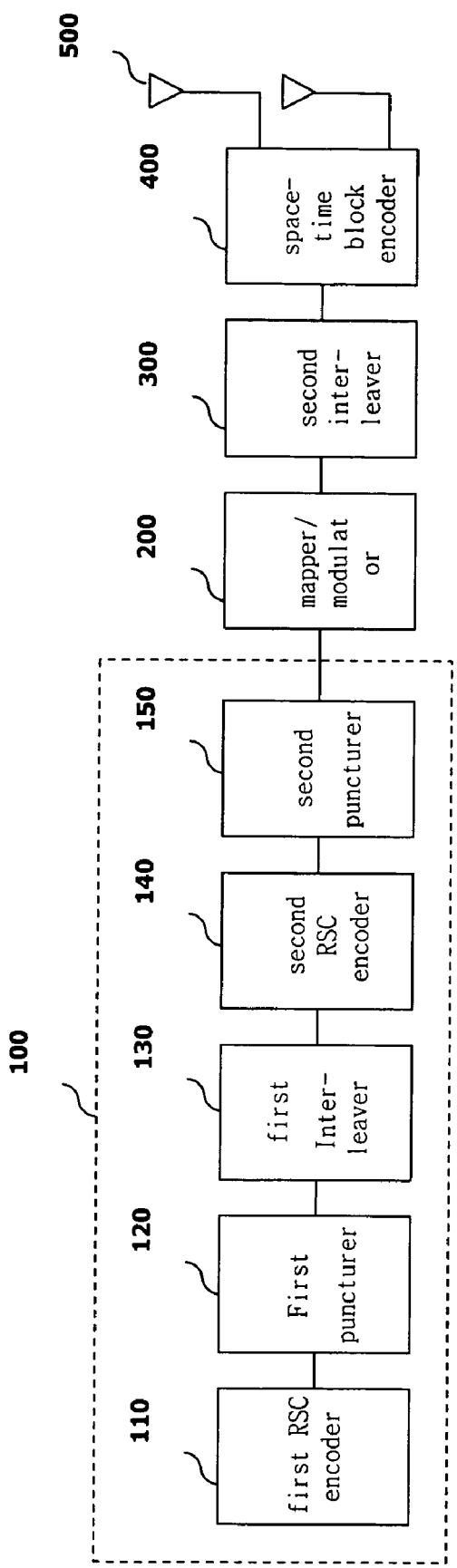
FIG. 1 is a view illustrating a configuration of a mobile communications terminal employing a space-time HARQ scheme in accordance with an embodiment of the present invention.

FIG. 1 is a view illustrating a configuration of a mobile communications terminal employing a space-time HARQ scheme in accordance with an embodiment of the present invention. The mobile communications terminal can be a mobile phone, a smart phone, a PDA, a PMP, a DMB terminal, etc. and can include other known components such as a display unit, a controller, etc.

As illustrated in FIG. 1, the mobile communications terminal employing a space-time HARQ scheme in accordance with the present invention may comprise a rate-compatible punctured SCCC encoder 100 for encoding data inputted based upon preset puncturing table(s), a mapper/modulator 200 for mapping the encoded data from the encoder 100 to a physical channel and modulating the mapped data, a second interleaver 300 for interleaving the modulated data from the mapper/modulator 200, a space-time block encoder 400 for encoding the interleaved data from the second interleaver 300, and at least one or more transmit antennas 500 for transmitting the encoded data from the space-time block encoder 400. All the components of the mobile communications terminal are operatively configured and coupled.

The rate-compatible punctured SCCC encoder 100 may include a first Recursive Systematic Convolutional (RSC) encoder 110 having a half (½) (coding) rate for encoding the inputted data, a first puncturer 120 for puncturing the encoded data from the first RSC encoder 110, a first interleaver 130 for interleaving the punctured data from the first puncturer 120, a second RSC encoder 140 having a half (½) (coding) rate for encoding the interleaved data from the first interleaver 130, and a second puncturer 150 for puncturing the encoded data from the second RSC encoder 140. The first and/or the second interleaver 130, 300 can be a random interleaver.

A method for supporting a space-time HARQ scheme of the mobile communications terminal having such configuration will now be explained with reference to FIG. 2 according to the present invention.

Figure 2:
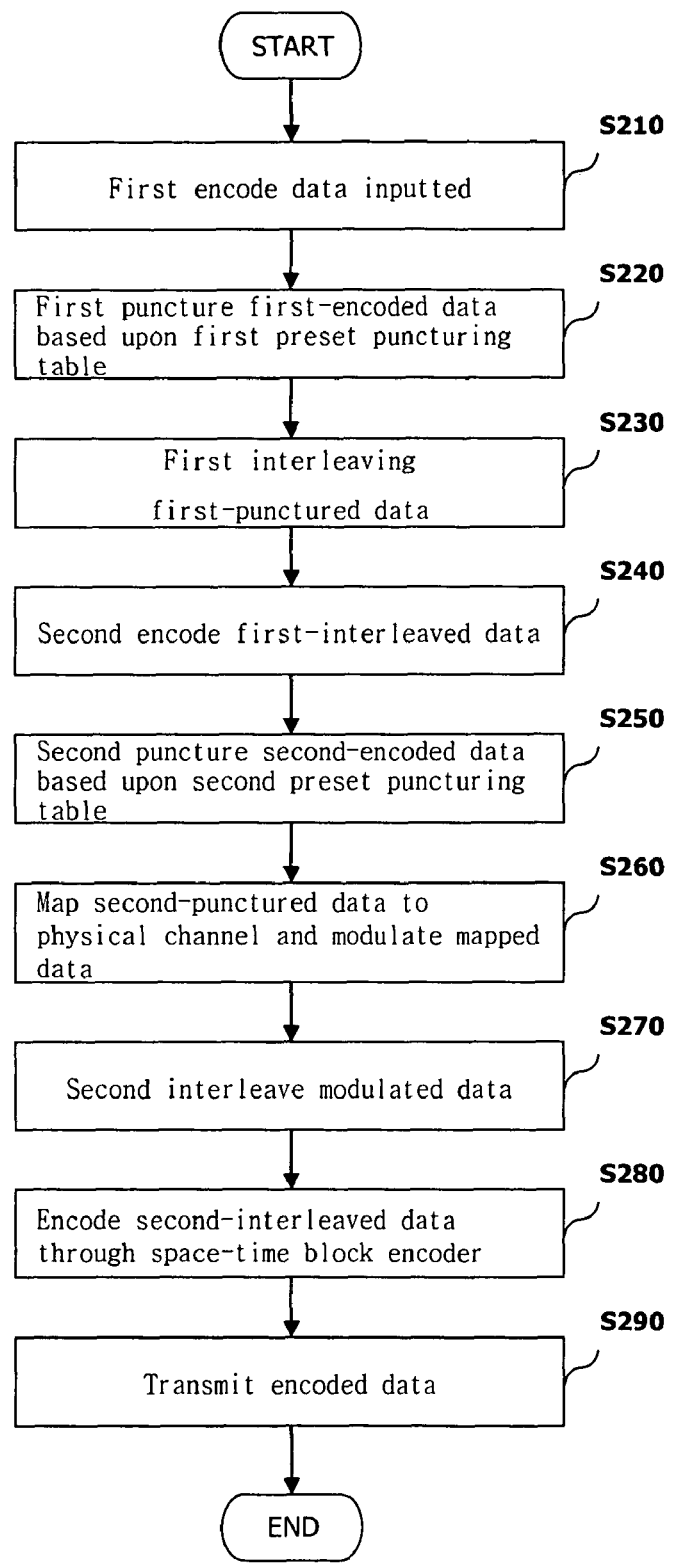
FIG. 2 is a flowchart illustrating sequential steps of a method for supporting a space-time HARQ scheme of a mobile communications terminal in accordance with an embodiment of the present invention.

More particularly, FIG. 2 is a flowchart illustrating the steps of a method for supporting a space-time HARQ scheme of a mobile communications terminal in accordance with an embodiment of the present invention. These steps are generally sequential steps, but may not necessarily be depending on the situation or implementation.

As illustrated in FIG. 2, the method for supporting the space-time HARQ scheme of the mobile communications terminal in accordance with the present invention may comprise first encoding data inputted (S210), first puncturing the first-encoded data based upon a first preset puncturing table (S220), first interleaving the first-punctured data (S230), second encoding the first-interleaved data (S240), second puncturing the second-encoded data based upon a second preset puncturing table (S250), mapping the second-punctured data to a physical channel and modulating the mapped data (S260), second interleaving the modulated data (S270), encoding the second-interleaved data through the space-time block encoder (S280), and transmitting the encoded data to an appropriate destination/device (S290).

The method of FIG. 2 will now be explained in detail as implemented in the mobile communications terminal of FIG. 1 as an example, but the method can be implemented in other suitable device/system according to the present invention.

Referring to FIGS. 1 and 2, first, the first RSC encoder 110 first encodes data inputted, namely, an information bit sequence u of a length N (S210), and the first puncturer 120 first punctures the encoded information bit sequence from the first RSC encoder 110 based upon a first rate-compatible puncturing table (S220).

Here, since the puncturing of systematic bits causes Bit Error Rate (BER) performance degradation for the RSC encoder 110, the first puncturer 120 can obtain a coded bit sequence d by a puncturing which changes an order of parity bits of the information bit sequence outputted from the first RSC encoder 110. For instance, an effective code rate of the first RSC encoder 110 becomes $\frac{2}{3} = 1/N_o$.

The first interleaver 130 randomly first interleaves the encoded (coded) information bit sequence d outputted from the first puncturer 120 (S230), and the second RSC encoder 140 second encodes the first-interleaved information bit sequence outputted from the first interleaver 130 (S240).

The second puncturer 150 second punctures an encoded information bit sequence b outputted from the second encoder 140 according to a second preset rate-compatible puncturing table (S250). An example of the second rate-compatible puncturing table will now be explained with reference to FIG. 3.

FIG. 3 is a view illustrating an example of a rate-compatible puncturing table in accordance with the present invention.

As illustrated in FIG. 3, the information bit sequence b outputted from the second encoder 140 consists of two parity components. The second rate-compatible puncturing table has a fixed puncturing pattern to generate a fixed code rate, while the first rate-compatible puncturing table (used at step S220) has a variable puncturing pattern. Here, although the second rate-compatible puncturing table is used, it can be extended to a variable table for more flexible rate-compatible puncturing.

A rate-compatible puncturing rule limits the puncturing pattern such that all of the coded bits of a high rate-compatible punctured code must be included in lower rate-compatible puncturing codes. The second rate-compatible puncturing table for the rate-compatible punctured SCCC encoder 100 generally consists of two sub-blocks each of which has p bits. Here, the two sub-blocks specify puncturing patterns for two parity bits, and p denotes a puncturing period. The second rate-compatible puncturing table $B_k$ is defined with respect to each puncturing index k, where k=0, 1, ..., $(n_t-1)$P. $B_{k+1}$ must have ones (e.g., 111) in the same positions as $B_k$ plus an additional one, and finally $B(n_t-1)$p becomes a puncturing table of all ones. The overall effective code rate of the system is $Rk=P/(n_O(P+K))$. Accordingly, the number of encoded bits can be varied due to a variety of puncturing.

Returning to FIGS. 1 and 2, after step S250, the mapper/modulator 200 maps an information bit sequence c punctured by the second puncturer 150 and then modulates the mapped information bit sequence (S260). The second interleaver 300 randomly interleaves the mapped information bit sequence x received from the mapper/modulator 200 (S270). Thereafter, the randomly-interleaved information bit sequence outputted from the second interleaver 300 is encoded by the space-time block encoder 400 (S280) and then the encoded information is outputted and transmitted (S290), e.g., via one or more antennas 500.

A mobile communications system will be considered according to the present invention, for instance, which has $N_T$ transmit antennas at a based station and $N_R$ receiver antennas at a mobile communications terminal for a radio Multiple Input Multiple Output (MIMO) fading channel.

A space-time block code (e.g., coding used in the encoder 400) is defined by a $T/N_T$ transmission matrix G, where T denotes the number of time slots for transmitting one block of symbols, and $N_T$ denotes the number of transmit antennas. Elements of the matrix G are linear combinations of indeterminate x1, x2, ..., xK and their conjugates. The throughput (rate) of the matrix G is defined to be R=K/T since the space-time block code transmits K-numbered constellation symbols in T time slot. All symbols $x_{ij}$ in the same row of the matrix G are transmitted from different NT transmit antennas through a MIMO channel at the same time t=1, 2, ..., T.

The received signal $r_{t,m}$ which is received at time t via a receive antenna m is given by Equation 1 as follows.

$$r_{t,m} = \sum_{n=1}^{N_T} \alpha_{nm} c_{t,n} + \eta_{t,m}$$ [Equation 1]

where a path gain from a transmit antenna n to a receive antenna m of the MIMO Rayleigh fading channel is defined to be $\alpha_{nm}$. Here, it is assumed that path gains are constant over a frame of a length T and varied from one frame to another. Noise samples $\eta_{t,m}$ denote complex Gaussian random variables of which average value is zero.

The rate-compatible punctured SCCC decoder for outputting soft-output uses iterative Soft Input Soft Output (SISO) Maximum a Posteriori (MAP) decoders. $r_t=[r_t, 1, ..., r_t, NR]$ denotes a received signal vector at time t=1, ..., K. Combined values $y_t$ can be calculated from the received signal using an orthogonality of the matrix G of the space-time block code. If perfect channel information is available, the first SISO MAP encoder computes a posterior probability of the transmitted signal ct and the combined signal yt by using Equation 2 as follows.

$$\log P(c_t|y_t) = A + \log P(y_t|c_t) + \log P(c_t)$$ [Equation 2]

where A denotes a constant that can be calculated by normalization. A priori probability Pct is assumed to be equal to 1/M. The second term in the above equation is obtained as $$\log P(y_t|c_t) = \frac{|y_t - c_t|}{2\sigma^2} - \frac{1}{2\sigma^2}|c_t|^2 \left(-1 + \sum_{n=1}^{N_T} \sum_{m=1}^{N_R} |\alpha_{nm}|^2\right)$$ [Equation 3]

where $|ct|^2$ is the same for all possible $x_t$, and accordingly the second term log $P(y_t|c_t)$ in the posterior probability of the transmitted signal. Thus, the soft-output channel information log $P(y_t|c_t)$ is inputted into a second SISO MAP decoder after being interleaved and is iteratively decoded by referring to the preset puncturing tables for each transmission. log $P(y_t|c_t)$ is set to zero for the preset puncturing tables.

If the decoded frame has detectable errors by checking Cycle Redundancy Check (CRC) parity bits after repeatedly performing a preset maximum number of decoding, the receiver sends a negative (NACK) message to the transmitter via a feedback channel to request retransmission. In addition, the complexity of the present invention mainly depends on the complexity of the rate-compatible punctured SCCC.

Hereinafter, computer simulations have been performed to show throughput performances of a mobile communications terminal which supports the space-time HARQ scheme according to the present invention, an explanation of which will now be made with reference to FIGS. 3, 4 and 5.

A frame size of 640 bits, pseudo-random interleaver and BPSK modulation have been used in the simulations. A transmit power of each transmit antenna is divided by $N_T$ to maintain the total transmit power. Two identical 4-state RSC having a code generator polynomials codes g(D)=(1, 5/7) in octal, and all encoders are terminated with tail-bit. All simulated frames are counted to average the throughput and the number of transmissions per frame regardless of an existence of the frame error. Puncturing tables are given as illustrated in FIG. 3, in which upper and lower rows correspond to the first and second parity sub-blocks having the puncturing period of 4, respectively. A 'complementary' puncturing has been introduced in the present invention as the puncturing method that excludes puncturing at the same position for the two parity sub-blocks. That is, B1 and B2 correspond to the complementary puncturing tables. The code rate Rk of all of the puncturing tables for the first, second and third transmissions are ⅔, 4/9 and ⅓, respectively, and tk is 4, 2 and 2, respectively.

Figure 4:
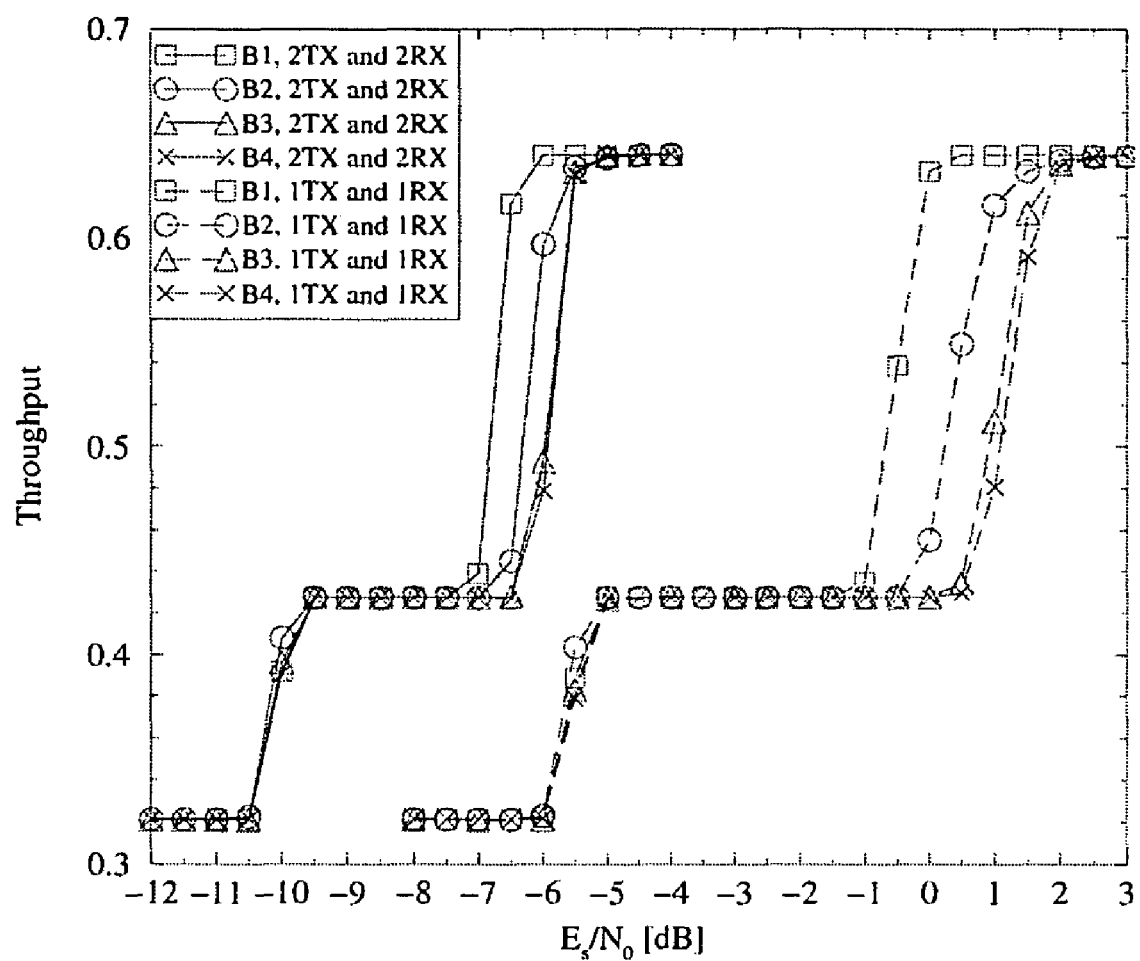
FIG. 4 is a graph illustrating an example of a throughput performance based upon different rate-compatible puncturing tables in accordance with the present invention.

FIG. 4 is an example of a graph illustrating throughput performances based upon different rate-compatible puncturing tables in accordance with the present invention.

As illustrated in FIG. 4, the throughput of the case with 2 transmit antennas and 2 receive antennas increases faster than the case without antenna diversity for all the puncturing tables. That is, the former is faster than the latter and reaches a high throughput state which is above 0.6. Therefore, the space-time block code (e.g., used in the space-time block encoder 400) based antenna diversity and iterative processing have a beneficial effect on the packet throughput performance. It is also shown that a case using B1 outperforms other puncturing cases. Thus, the case using the complementary puncturing tables for the parity sub-blocks yields better throughput than the case using other puncturing tables. Hence, comparing B1 to B2 shows that higher throughput can be obtained by the puncturing based upon changes in each parity sub-block.

Figure 5:
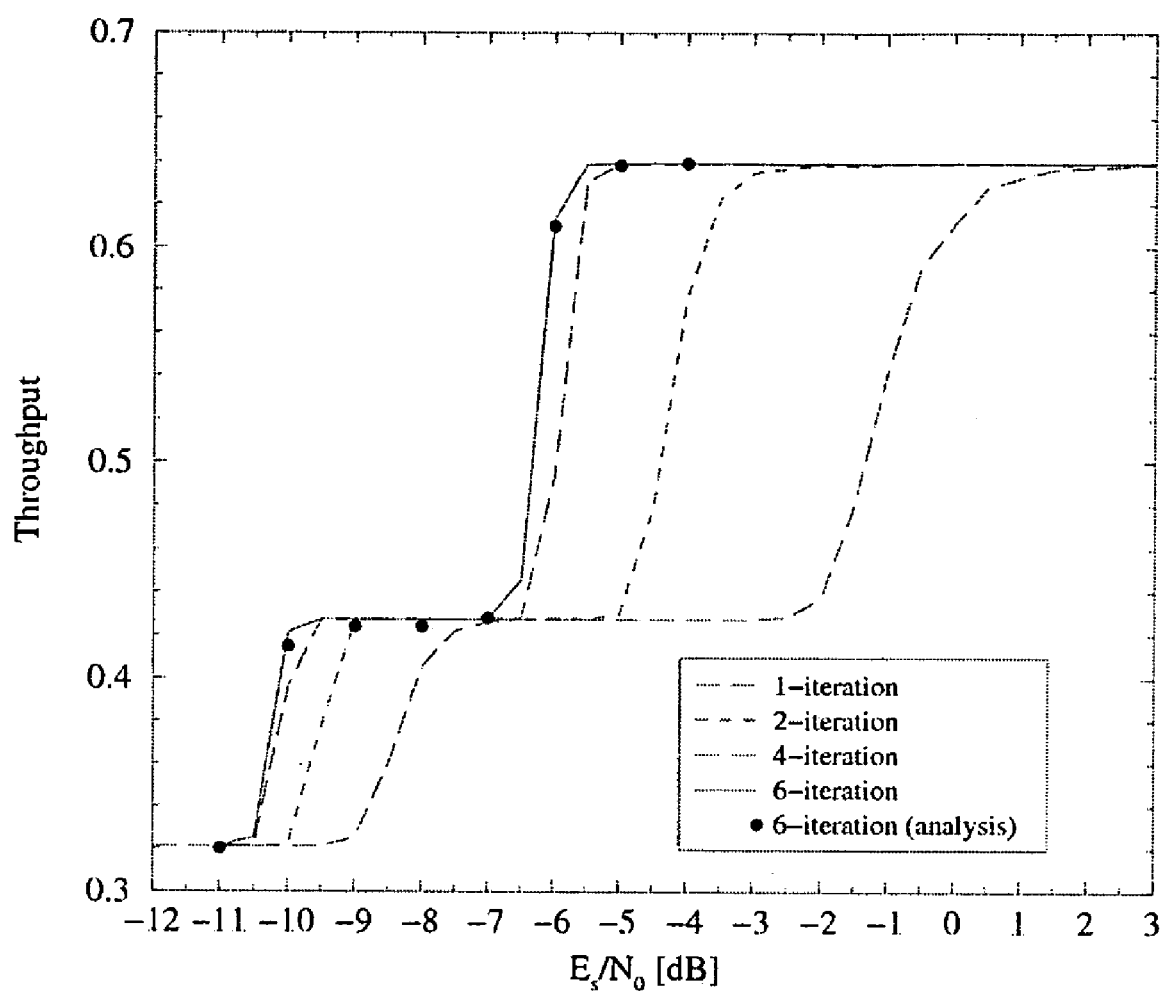
FIG. 5 is a graph illustrating an example of a transfer rate performance based upon different number of decoding iterations over a 2 by 2 MIMO fading channel in accordance with the present invention.

FIG. 5 is an example of a graph illustrating throughput performances based upon a different number of decoding iterations over a 2 by 2 MIMO fading channel in accordance with the present invention.

As illustrated in FIG. 5, it can be noted that the throughput performances according to the present invention are improved by the decoding iterations. In addition, the analysis result of the throughput is well identical with the simulation result.

Consequently, the present invention can provide better flexibility in multiple antenna configuration, code concatenation, adaptive modulation and coding, and interference cancellation. The present invention provides an additional coding gain through the iterative processing as well as the diversity gain having a receiver structure with low detection complexity, resulting in a high-speed and adaptive packet transmission. The present invention also yields faster throughput than that of the case without the antenna diversity. The HARQ scheme having the efficient puncturing patterns offers a rate adaptation as well as high-speed throughput over the radio MIMO fading channel. Furthermore, the present invention can be extended to adaptive changes in an antenna assignment or a grouping of coded symbols upon retransmission requests as well as the number of antennas and other code concatenations. Therefore, a high-speed and high-reliable packet data transmission can be implemented through the present invention.

As described above, in the mobile communications terminal for supporting the space-time HARQ scheme and the method thereof according to the present invention, the HARQ scheme which uses the space-time block coding combined with the rate-compatible SCCC can be employed so as to implement the high-speed and high-reliable packet data transmission.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communications terminal for supporting a space-time Hybrid Automatic Repeat reQuest (HARQ) scheme, comprising:
    an encoder configured to encode data based upon at least one preset puncturing table;
    a mapper/modulator configured to map the encoded data to a physical channel and modulate the mapped data;
    a second interleaver configured to interleave the modulated data;
    a space-time block encoder configured to encode the interleaved modulated data for multiple input/multiple output (MIMO) transmitting; and
    at least two antennas configured to MIMO transmit the encoded interleaved data via the HARQ scheme,
    wherein the encoder includes:
        a first encoder configured to encode the data and generate first-encoded data;
        a first puncturer configured to puncture the first-encoded data based upon a first preset puncturing table and generating first-punctured data;
        a first interleaver configured to interleave the first-punctured data and generate first-interleaved data;
        a second encoder configured to encode the first-interleaved date and generate second-encoded data; and
    a second puncturer configured to puncture the second-encoded data based upon a second preset puncturing table, and
    wherein the second preset puncturing table comprises one of
        two sub-blocks, each having p bits and specifying puncturing patterns for two parity bits, with p denoting a puncturing period, and
        two sub-blocks arranged to exclude puncturing at a same position within the two sub-blocks.

2. The terminal of claim 1, wherein one of the at least one preset puncturing table is a rate-compatible puncturing table.

3. The terminal of claim 1, wherein the encoder is a rate-compatible punctured Serial Concatenated Convolutional Code (SCCC) encoder.

4. The terminal of claim 1, wherein at least one of the first and second encoders is a Recursive Systematic Convolutional (RSC) encoder.

5. The terminal of claim 1, wherein the first interleaver is a random interleaver.

6. The terminal of claim 1, wherein the second interleaver is a random interleaver.

7. The terminal of claim 1, wherein the HARQ scheme is an Incremental Redundancy (IR) HARQ scheme, in which supplemental code bits are incrementally transmitted to obtain a next lowest rate code so as to adaptively meet predetermined service error and throughput performance requirements.

8. A method for supporting a space-time Hybrid Automatic Repeat reQuest (HARQ) scheme, comprising:
    encoding data based upon at least one preset puncturing table with at least one encoder;
    mapping the encoded data to a physical channel and modulating the mapped data with a mapper/modulator;
    interleaving the modulated data with a second interleaver;
    encoding the interleaved modulated data through a space-time block encoder for a multiple input/multiple output (MIMO) transmission; and
    MIMO transmitting the encoded interleaved data via at least two antennas via the HARQ scheme, wherein the step of encoding includes:
first encoding the data with a first of the at least one encoder;
first puncturing the first-encoded data based upon a first preset puncturing table with a first puncturer;
first interleaving the first-punctured data with a first interleaver;
second encoding the first-interleaved data with a second of the at least one encoder; and
second puncturing the second-encoded data based upon a second preset puncturing table with a second puncturer, and
wherein the second preset puncturing table comprises one of
two sub-blocks, each having p bits and specifying puncturing patterns for two parity bits, with p denoting puncturing period, and
two sub-blocks arranged to exclude puncturing at a same position within the two sub-blocks.

9. The method of claim 8, wherein in the encoding, one of the at least one preset puncturing table is a rate-compatible puncturing table.

10. The method of claim 8, wherein the encoding is executed by a rate-compatible puncturing Serial Concatenated Convolutional Code (SCCC) encoder.

11. The method of claim 8, wherein at least one of the first and second encodings is executed by a Recursive Systematic Convolutional (RSC) encoder.

12. The method of claim 8, wherein the first interleaving is executed by a random interleaver.

13. The method of claim 8, wherein the interleaving is executed by a random interleaver.

14. The method of claim 8,
wherein the second preset puncturing table is a puncturing table $B_k$, where k is a puncturing index corresponding to a puncturing period, and
wherein $B_{k+1}$ comprises ones in positions common to positions in $B_k$ plus an additional one so as to create a puncturing table consisting of all ones.

15. The terminal of claim 8, wherein the HARQ scheme is an Incremental Redundancy (IR) HARQ scheme, in which supplemental code bits are incrementally transmitted to obtain a next lowest rate code so as to adaptively meet predetermined service error and throughput performance requirements.

16. A mobile communications terminal for supporting a space-time Hybrid Automatic Repeat reQuest (HARQ) scheme, comprising:
an encoder configured to encode data based upon at least one puncturing table;
a mapper/modulator configured to map the encoded data to a physical channel and modulate the mapped data;
a second interleaver configured to interleave the modulated data;
a space-time block encoder configured to encode the interleaved modulated data for multiple input/multiple output (MIMO) transmitting; and
at least two antennas configured to MIMO transmit the encoded interleaved data via the HARQ scheme,
wherein the encoder includes:
a first encoder configured to encode the data and generate first-encoded data;
a first puncturer configured to puncture the first-encoded data based upon a first preset puncturing table and generating first-punctured data;
a first interleaver configured to interleave the first-punctured data and generate first-interleaved data;
a second encoder configured to encode the first-interleaved data and generate second-encoded data; and
a second puncturer configured to puncture the second-encoded data based upon a second preset puncturing table, and
wherein the step of first puncturing includes puncturing with a variable pattern configured to change an order of parity bits of first encoded data,
wherein the second-encoded data includes two parity components, and
wherein the step of second puncturing includes puncturing with a fixed pattern configured to generate the second-encoded data having a fixed code rate.

17. The terminal of claim 1,
wherein the second preset puncturing table is a puncturing table $B_k$, where k is a puncturing index corresponding t a puncturing period, and
wherein $B_{k+1}$ comprises ones in positions common to positions in $B_k$ plus an additional one so as to create a puncturing table consisting of all ones.

18. A method for supporting a space-time Hybrid Automatic Repeat reQuest (HARQ) scheme, comprising:
encoding data based upon at least one preset puncturing table with at least one encoder;
mapping the encoded data to a physical channel and modulating the mapped data with a mapper/modulator;
interleaving the modulated data with a second interleaver;
encoding the interleaved modulated data through a space-time block encoder for a multiple input/multiple output (MIMO) transmission; and
MIMO transmitting the encoded interleaved data via at least two antennas via the HARQ scheme,
wherein the step of encoding includes:
first encoding the data with a first of the at least one encoder;
first puncturing the first-encoded data based upon a first preset puncturing table with a first puncturer;
first interleaving the first-punctured data with a first interleaver;
second encoding the first-interleaved data with a second of the at least one encoder; and
second puncturing the second-encoded data based upon a second preset puncturing table with a second puncturer, and
wherein the first puncturing is a veriable pattern puncturing configured to change an order of parity bits of first encoded data,
wherein the second-encoded data includes two parity components, and
wherein the second puncturing is a fixed pattern puncturing configured to generate the second-encoded data having a fixed code rate.

* * * * *